UNITED STATES PATENT OFFICE.

EDMUND M. FLAHERTY, OF PARLIN, NEW JERSEY, ASSIGNOR TO E. I. DU PONT DE NEMOURS & COMPANY, OF WILMINGTON, DELAWARE, A CORPORATION OF DELAWARE.

SOLVENT FOR USE WITH PYROXYLIN AND COMPOSITIONS CONTAINING THE SAME.

1,341,710.  Specification of Letters Patent.  Patented June 1, 1920.

No Drawing.  Application filed September 11, 1918. Serial No. 253,526.

*To all whom it may concern:*

Be it known that I, EDMUND M. FLAHERTY, of Parlin, in the county of Middlesex, and in the State of New Jersey, have invented a certain new and useful Improvement in Solvents for Use with Pyroxylin and Compositions Containing the Same, and do hereby declare that the following is a full, clear, and exact description thereof.

The object of my invention is to provide a solvent for pyroxylin bodies having the qualities of being cheap, having high solvent power, being free from precipitation of pyroxylin, non-hygroscopic, adapted to form a very fluid but cohesive solution, of pleasant odor, and having the property of depositing a film of nitrocellulose which is strong, transparent, and free from bubbles.

A further object is to use a solvent composition containing constituents which have approximately the same vapor tension, as it is desirable to have a number of the constituents evaporate more or less simultaneously.

A further object is to provide a solvent composition which, by reason of the presence of the particular alcohol therein, can be regulated as to its fluidity by varying the quantity of the alcohol as compared with the quantity of solid constituents therein.

In the pyroxylin industries, such as in the manufacture of lacquers, photographic film, artificial leather, varnishes, etc., there is a demand for a solvent having the above stated qualities. None of the ordinary pyroxylin solvents, such as glacial acetic acid, amyl acetate and acetone, including their homologues and derivatives, have all of these properties in the highest degree, except, perhaps, amyl acetate and refined fusel oil, the cost of which is so excessive as to prevent a wide use of these latter solvents in the pyroxylin industries. In these several industries, it is desirable to vary the relative proportions of the solvent and pyroxylin to obtain a solution of the strength desired, according to the nature of the pyroxylin film to be formed. For example, in lacquer work the solution ordinarily does not contain over five ounces of pyroxylin per gallon in order that a film of proper thickness may be deposited. In some of the decorative arts a very heavy film is employed, which can be deposited from a solution containing as high as twenty ounces of pyroxylin per gallon. There is, thus, for each industry a strength of solution which is best adapted thereto. Where a solution is desired having less pyroxylin than the total amount which the solvent is capable of taking up (for instance, if a solution of twenty ounces of pyroxylin to a gallon of solvent were desired, which is less than the total amount which the solvent would take up), it is unnecessary to have the entire quantity of solution composed of pure solvent, it only being necessary to have enough solvent present to dissolve the desired amount of pyroxylin. For economy, therefore, it is customary to add cheap diluents to the solvent, which diluents are either entirely non-solvent or nearly so. The use of diluents, however, introduces difficulties, among which may be mentioned the following: When, as used in a factory, these solvents are evaporated at the ordinary room atmosphere in order to deposit a film of pyroxylin, there is a tendency, except in the case of those solvents which are non-hygroscopic but expensive, such as amyl acetate and refined fusel oil, toward a separation out of the nitrocellulose or other solvents through absorption of moisture from the air or through the change in the composition of the solvent mixture resulting from the unequal rate of evaporation of its components, this precipitation being usually evidenced by the appearance of a whitish substance, technically known as "blushing" or "blooming," or by the settling to the bottom of a jellylike mass. Such separation tends to decrease the strength of the film, and in some cases the white appearance produces objectionable color effects.

Normal butyl alcohol has the property of preventing precipitation of the pyroxylin during evaporation and in this respect is an excellent substitute for the refined fusel oil commonly used, the price of which at the present time is so high as to limit its use to a very few branches of the pyroxylin industry.

I find that during evaporation under ordinary factory conditions pyroxylin dissolved in a mixture of a pyroxylin solvent and normal butyl alcohol, with or without, the addition of a cheap diluent, such as benzol or benzene deposits a film which is strong, transparent and free from bubbles.

For use as a lacquer the following mixture may be used:

| | |
|---|---|
| Normal butyl alcohol | 15% by weight. |
| Amyl acetate | 50% " " |
| Benzin | 35% " " |
| Nitrocellulose | 8 ounces to one gallon of the above solvent mixture. |

But the relative percentages of these ingredients may vary widely according to the conditions covering the uses to which the solution is to be put. Any nitrocellulose solvent, as, for example, another alkyl acetate or acetates, such as ethyl acetate, iso butyl acetate or normal butyl acetate, or acetone oil, may be substituted for the amyl acetate in the above mixture.

An increase in the benzin component results in reduced cost; and its disadvantage lies in the less rapid solvent action which such mixture possesses.

The fluidity can be varied by varying the quantity of normal butyl alcohol.

Numerous other substances, such as oils, pigments, gums, resins, liquids, etc., may be added to the pyroxylin mixture, each having its own properties, and these properties will, of course, affect the properties of the final mixture, but the general principle will still obtain.

I find that my mixture is comparatively non-hygroscopic, which is a very desirable quality, since the absorption of water in such a solution results in a precipitation of the pyroxylin.

The properties of normal butyl alcohol are in general very advantageous in compositions of this character, as it has a slow evaporation, tends to inhibit blushing, produces smooth mixtures and smooth coatings, prevents the formation of air bubbles in the coatings, is relatively cheap.

Normal butyl alcohol is superior to iso butyl alcohol in such mixtures as it evaporates more slowly, thus tending to produce a smooth film and giving less "blushing" trouble.

While I have described my invention above in detail, I wish it to be understood that many changes may be made therein without departing from the spirit of the invention.

Claims:

1. A solvent mixture comprising a nitrocellulose solvent and normal butyl alcohol.

2. A solvent mixture comprising alkyl acetate and normal butyl alcohol.

3. A solvent mixture comprising a nitrocellulose solvent, normal butyl alcohol and another diluent.

4. A solvent mixture comprising amyl acetate, normal butyl alcohol and another diluent.

5. A solvent mixture comprising a nitrocellulose solvent, normal butyl alcohol and benzin.

6. A solvent mixture comprising amyl acetate, normal butyl alcohol and benzin.

7. A composition comprising nitrocellulose, and a solvent mixture comprising a nitrocellulose solvent and normal butyl alcohol.

8. A composition comprising nitrocellulose, and a solvent mixture comprising amyl acetate and normal butyl alcohol.

9. A composition comprising nitrocellulose, and a solvent mixture comprising a nitrocellulose solvent, normal butyl alcohol and another diluent.

10. A composition comprising nitrocellulose, and a solvent mixture comprising amyl acetate, normal butyl alcohol and another diluent.

11. A composition comprising nitrocellulose, and a solvent mixture comprising a nitrocellulose solvent, normal butyl alcohol and benzin.

12. A composition comprising nitrocellulose, and a solvent mixture comprising amyl acetate, normal butyl alcohol and benzin.

In testimony that I claim the foregoing I have hereunto set my hand.

EDMUND M. FLAHERTY.

Witnesses:
H. N. WILSON,
MARY PETERSEN.